United States Patent [19]
Bobard

[11] 4,298,047
[45] Nov. 3, 1981

[54] BALLASTING AND INFLATION APPARATUS

[75] Inventor: Emile Bobard, Beaune, France
[73] Assignee: Bobard Jeune, S.A., Beaune, France; a part interest
[21] Appl. No.: 120,326
[22] Filed: Feb. 11, 1980

[30] Foreign Application Priority Data

Feb. 12, 1979 [FR] France .................. 79 03687

[51] Int. Cl.³ ................... B60C 23/10; B60C 29/00
[52] U.S. Cl. .................................. 152/417; 137/223; 141/38; 152/330 R; 152/427; 152/DIG. 5
[58] Field of Search ............. 141/38; 152/415, 330 R, 152/416, 417, 427, DIG. 5; 137/223, 588

[56] References Cited

U.S. PATENT DOCUMENTS

| | | | |
|---|---|---|---|
| 2,168,690 | 8/1939 | Uksila | 152/416 |
| 2,339,381 | 0/1944 | Crowley | 152/427 |
| 2,463,522 | 3/1949 | Davidson | 152/416 |
| 4,197,895 | 4/1980 | Reyes | 152/416 |

FOREIGN PATENT DOCUMENTS

928790 of 1947 France.
1484734 of 1967 France.
2379975 of 1977 France.

Primary Examiner—John E. Kittle
Assistant Examiner—Thomas Bokan
Attorney, Agent, or Firm—Sandler & Greenblum

[57] ABSTRACT

Apparatus is provided for use with a tractor or like vehicle. The apparatus is adapted to liquid ballast and inflate a tube within a wheel of the vehicle. The apparatus comprises inflation means which include a pump adapted to pressurize air or liquid to the inflation pressure of the tube. A reservoir is provided which is adapted to be filled with ballast. The apparatus includes a nozzle adapted to fit within the tube. The nozzle is adapted to be positioned to purge up to 100% of the fluid within the tube at ambient pressures. The apparatus also includes piping means connecting the pump to the nozzle, and the pump to the reservoir.

13 Claims, 7 Drawing Figures

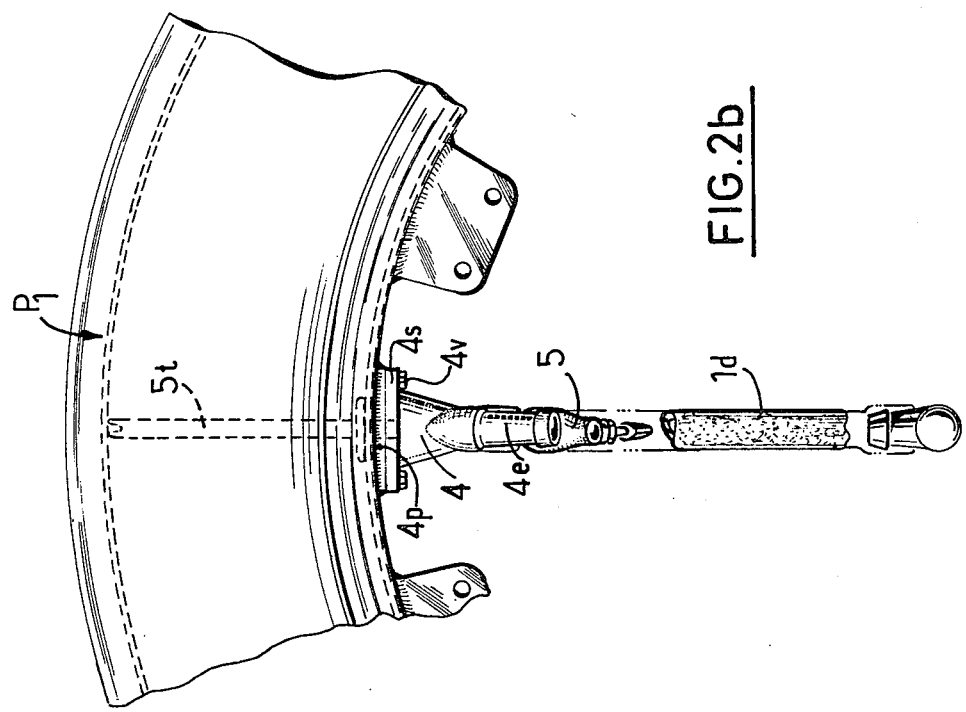
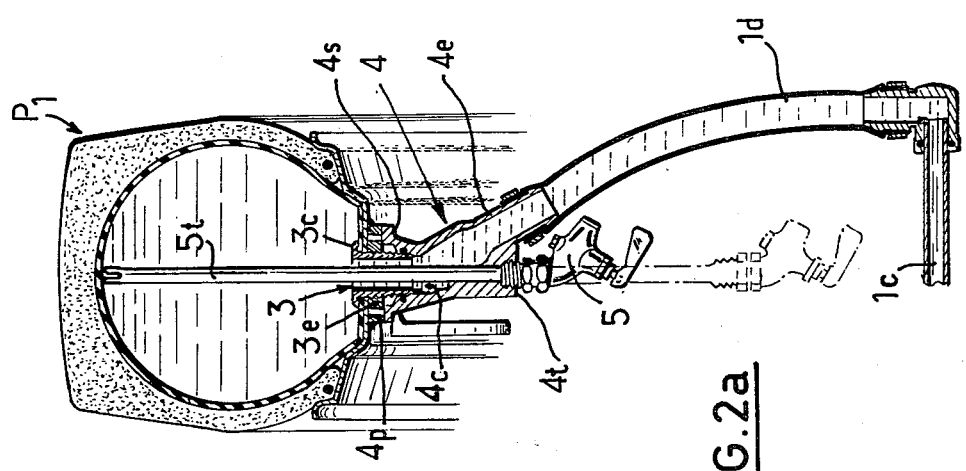

BALLASTING AND INFLATION APPARATUS

BACKGROUND OF THE INVENTION

1. Field of the Invention

The invention relates to an apparatus for use with tractors and the like making it possible to both "water" ballast and inflate the tire tubes of the wheels of the tractors as well as to air inflate them and to adjust the pressure of these tires tubes during operation of the tractor.

2. Description of the Prior Art

French Pat. No. 2,379,975, in the name of Emile Bobard and Bobard Jeune S. A., proposes a device which is applicable to tire tubes which are ballasted up to 100% with water and which allows for a high tractor which goes over the material being worked to couple and to uncouple from work devices by deflation and inflation of the tubes of its wheels.

Even though this equipment allows for the adjustment during use of the inflation pressure, ballasting and deballasting requires immobilization of the tractor, which is obviously a drawback to its utility.

French Pat. No. 1,484,734 proposes tubed tires weighted, at least partially, by "water inflation" under an adjustable pressure during use.

French Pat. No. 928,790 proposes water inflating pneumatic tires under a pressure conferring to these tires a rigidity which is similar to that of a normal tire. This pressure is adjustable so as to allow for normal pneumatic elasticity.

However, the tires of such wheels which are used to equip devices such as road repair machinery are adapted to withstand forces which cannot be compared to those which are applied to the tubes of normal tractors and the proposed inflation with up to 100% water cannot be achieved with such machinery except in theory because the pressure adjustment means equipping these devices and machines do not allow for more than 75% filling of the tubes with the liquid.

SUMMARY OF THE INVENTION

It is an object of the invention to provide an apparatus for overcoming the above and other disadvantages.

The invention has as an essential aim to allow a driver of a conventional tractor to accomplish, simply and by himself, liquid ballasting, up to 100% of the tubes of his tractor. The invention further makes it possible to adjust the inflation pressure of these tubes during operation of the tractor of the tire whatever their ballast level.

Another advantageous aim of the invention is to allow a tractor driver whose tire tubes are ballasted, at least partially, by a liquid, to transfer, during use, the ballast liquid from one tube to another tire tube. This possibility of transferring ballast liquid assures proper operation for a tractor positioned at an angle when operating on inclined terrain.

The invention has further as an object to provide an apparatus for equipping a conventional tractor or the like allowing for "water" ballasting, inflation with air or water, and the adjustment of the pressure of the tubes of the wheels of the tractor. The inventive apparatus comprises piping arrangements and analagous means rendering it compatible with work or road equipment, hoists, tractors and other such heavy equipment.

According to the invention, each wheel tube is connected to the device via one single nozzle allowing for the purging of up to 100% of the air contained in the tube under ambient pressure and the device further comprises an inflating compressor capable of compressing both the air and the liquid to the normal inflation pressures of tires and their tubes.

The purge nozzle for the air in a preferred embodiment generally comprises a valve comprising two conduits which respectively assure complete feeding and purging of both air and liquid.

It will be understood that such apparatus allows, when the tractor is stopped, for the rapid ballasting and deballasting of the tubes of the wheels so as to provide for optimal utilization of these tubes depending on the work being performed.

According to another characteristic of the invention which assures the maximal utilization of a tractor on sloped terrain, the tractor device comprises a valve system making it possible for the inflation compressor to transfer, during use and movement of the road equipment, the ballast liquid from the tube of one wheel into the tube of another wheel.

The apparatus of the invention which is adapted for use with a tractor or like vehicle is adapted to provide liquid ballasting and inflation of a tube within a wheel of the vehicle. The apparatus comprises inflation means, comprising a pump adapted to pressurize air or liquid to the inflation pressure of the tube. The apparatus further comprises a reservoir adapted to be filled with ballast liquid and a nozzle adapted to fit within the tube. The nozzle is adapted to be positioned to purge up to 100% of the fluid within the tube at ambient pressures. Piping means connecting the pump to the nozzle, and the pump to the reservoir are also provided.

BRIEF DESCRIPTION OF THE DRAWINGS

Other characteristics and advantages of the invention will appear from the description which follows with reference to the annexed drawings, given by way of non-limiting example only:

FIGS. 2a and 2b illustrate, respectively, in axial cross-section and lateral elevation, on a magnified scale, a feed and purge nozzle incorporated into the device of FIG. 1;

DESCRIPTION OF PREFERRED EMBODIMENTS

Figure 1:
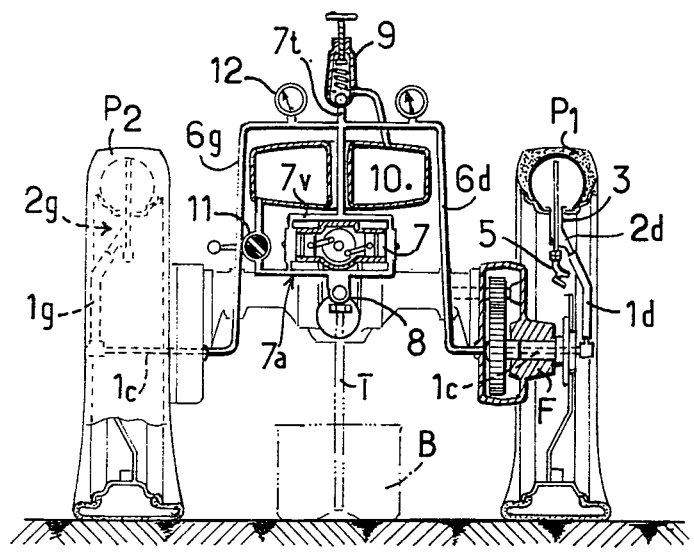
FIG. 1 schematically illustrates a rear elevational view of the device according to the invention applied to the wheel train of the drive wheels of a conventional tractor.

As shown in FIG. 1, two "tires", P1 and P2, of a motive or drive wheel train of a conventional tractor are disclosed. Each axle F of these wheels has an axial conduit 1c which allows (by virtue of a known arrangement of pipes and journalled joints) for the circulation of fluid from inside to outside of each wheel.

It is in this manner that the tire P1 is connected, from the exterior, to the axle F of its wheel by a line 1d and nozzle 2d which is more clearly visible in FIGS. 2a and 2b.

Nozzle 2d acts as an inflation valve for tire P1 but its dimensions, particularly its diameter, are substantially greater than that of a conventional valve to allow for flows greater than those of conventional valves. It is for this reason that the nozzle 2d is mounted on the cylindrical portion of the rim provided with the tire P1 and comprises:

(a) a tubular socket 3 including a first passageway engaged in a hole of this rim, the socket having a small retention collar 3c and a thread for an attachment bolt 3e on this rim; and (b) an attachment element 4 comprising an attachment base 4s (with the assistance of screw 4v) on a mounting 4p appropriately provided on the external face of the rim in a fashion so as to coaxially cover, by mating, the socket 3. Attachment element 4 has a conduit 4c (coaxial with that of the socket 3) whose terminal portion 4t is tapped and a tubular oblique portion 4e arranged obliquely towards the exterior with respect to conduit 4c.

Finally, a spigot of a conventional type 5 is mounted by virtue of a thread in the terminal portion 4t of the attachment element 4. This spigot 5 is provided with a flexible tubing 5t having an appropriate flexibility which is slidingly engaged in conduit 4c of the attachment element 4 and the conduit of socket 3 by extending radially into the internal portion of greatest diameter of the tire P1. It will be explained below that the diameters of conduits 4c and of the socket as well as of the tube have flow cross-sections which are about equal and which are as large as possible.

The axial conduit 1c of the axle F extends towards the interior of the tractor, via an attachment pipe 6d to a device mounted on the chassis of the tractor.

This device comprises a pump 7 having two "opposed" pistons, coupled by a transmission chain to a driving means of the tractor, not shown.

The aspiration collector 7a common to the two cylinders of this pump 7 is provided with a retention valve 8, provided with an attachment for a pipe, while its discharge collector 7v is connected, by a tube 7t, to discharge valve 9, in the form of a check valve as shown, having an adjustment spring for the varying discharge pressure.

The discharge tube of valve 9 is connected to a reservoir 10 which is itself connected to the aspiration collector 7a by a pipe provided with a valve 11.

Figure 4:
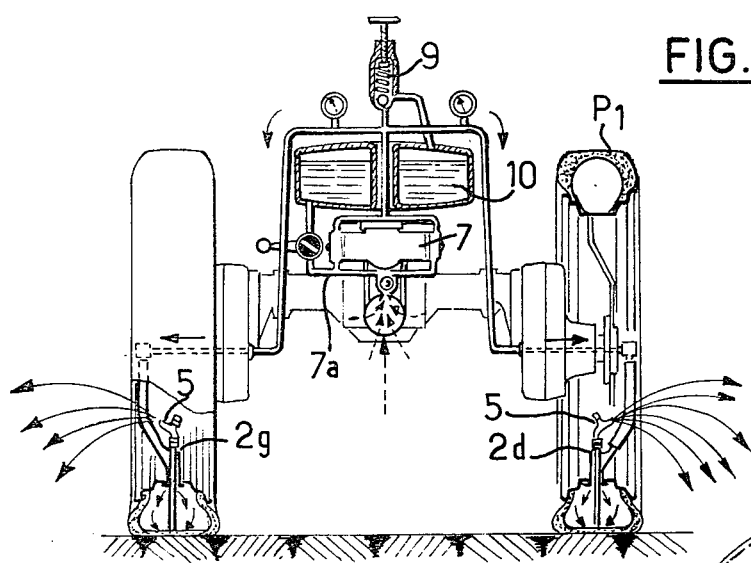

Finally, tire P2 is equipped with a nozzle connector 2g (see FIG. 4) identical to the nozzle 2d described above and is connected in the same fashion, to elements 7, 9 and 10 by a pipe 6g provided with a manometer 12. The pipes 6g and 6d are connected, as bifurcations, on the discharge tube 7t of the pump 7.

It should be noted that the pump 7 is of the type generally used for anticryptogamic treatments of fields, by pulverization of liquids under pressure and that its compression dead spaces have been reduced, as much as possible, so as to be able to easily pressurize air to the conventional pressures used for tubes of tractor wheels.

Furthermore, in the examples shown, the collectors 7a and 7v are respectively arranged beneath and above the pump 7 while the reservoir 10 is arranged above the pump and the tube provided with valve 11 is connected to the lower portion of the reservoir 10.

A ballasting operation of tires P1 and P2 by a liquid is performed as follows:

(a) tires P1 and P2 being inflated normally with air; nozzles 2d and 2g are brought to their "upright positions" by a "turnaround" of the tractor (in the fashion of a tourniquet);

(b) spigots 5 are opened to deflate tires P1 and P2; and (c) valve 8 is connected, via a tube T, to a container B containing a quantity of ballast liquid at least equal to the total amount which may be contained by the two tires under their maximum inflation pressure (approximately 2 kg/cm);

(d) pump 7 is activated and valve 9 is adjusted to the desired pressure (for example, the maximum pressure) to fill tires P1 and P2 and to purge them of air;

(e) as soon as the liquid begins to flow through spigots 5, the spigots are closed; and (f) pump 7 is stopped as soon as valve 9 begins to discharge liquid into reservoir 10.

One can then disconnect the tube T to utilize the tractor whose motor wheels are ballasted with 100% liquid.

If the tractor is to be used under conditions wherein the inflation pressure is lower, one distends the spring of the valve 9 while the machinery is in motion, which then discharges the ballast liquid under pressure into the reservoir 10 until the manometer 12 indicates the desired pressure.

Figure 3:
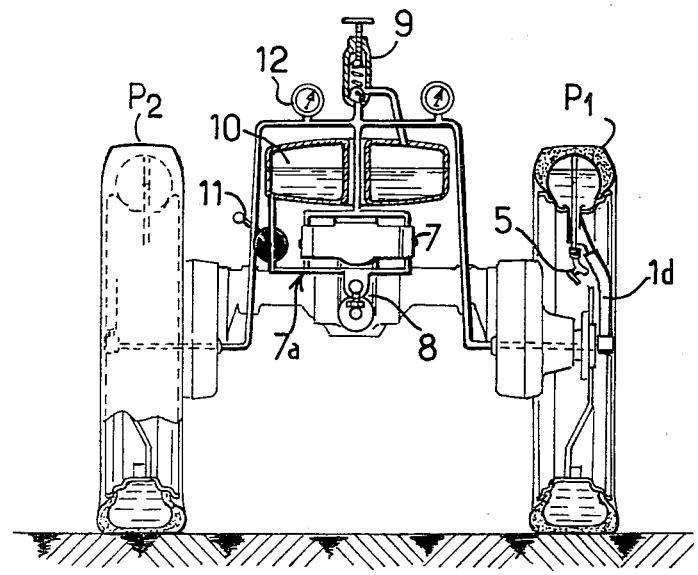
FIGS. 3 and 4 are Figures analagous to FIG. 1 illustrating the ballasting and deballasting of tubes of tractor wheels.

Conversely, if the inflation pressure is to be increased (FIG. 3), valve 11 is opened to feed the pump 7 and the pump is activated. As soon as the desired pressure has been obtained, the pump 7 is stopped and valve 11 is closed.

In those instances where the tractor is to be completely deballasted, one proceeds as follows (FIG. 4):

(a) with valve 11 in the closed position, the two nozzles 2d and 2g are brought to their lowest position, spigots 5 are opened and the ballasting liquid escapes;

(b) the pump is activated to draw in air, forcing the liquid of the tires from the interior to the exterior via the spigots 5 of the nozzles 2d and 2g; and (c) as soon as the liquid is evacuated, the nozzles are closed, while the pump continues to function and the inflation with the compressed air occurs until the desired pressure is indicated by the manometer 12, at which time the pump is stopped.

Figure 5:
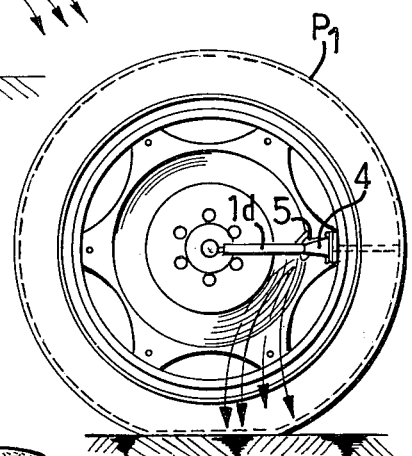
FIG. 5 is an elevational view of a wheel illustrating how partial deballasting can be achieved.

It will be readily understood that by virtue of the different positions which movement in the form of a tourniquet by the tractor can provide to the purged nozzles 2 between the two extreme vertical positions of the axles F, one can easily obtain all the ballasting levels included between 0% and 100%, which may be achieved during both the ballasting and deballasting operations (see, e.g., FIG. 5, having 50% ballast).

Figure 6:
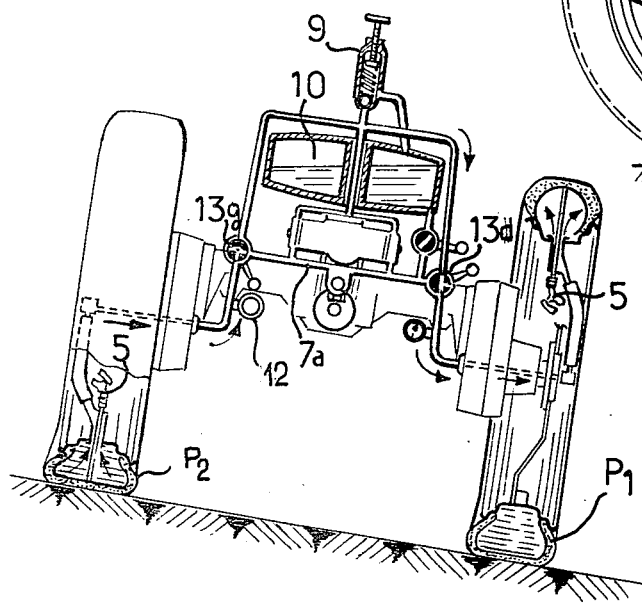
FIG. 6 schematically illustrates an alternative embodiment to the device of FIG. 1.

In the embodiment shown in FIG. 6, the aspiration collector 7a is connected to the pipes 6d and 6g by three-way valves 13d and 13g respectively. These valves allow for all of the circulation of the fluid described above as well as for the insulation of these pipes from one another to prevent the transfer of the ballast liquid which might imbalance the wheels, or to place one or the other in communication with the aspiration collector 7a of the pump.

Furthermore, when the tractor rotates while transversely slanted (for example to the right, as shown in FIG. 6), the valve 13g is activated to place the pump 7 in communication with the tire P2. The pump 7 can thus remove liquid in the tire P2 arranged at a higher level so as to transfer the liquid into tire P1 which is at a lower level and which is overloaded so as to prevent the tractor from further leaning over.

It will be noted that each tire is equipped with a single nozzle 2d or 2g, which allows for assembly and disassembly of the tires in a fashion which is as easy as with conventional tires despite the special nature of the nozzles 2d or 2g.

Of course, the reservoir 10 can also be arranged otherwise. For example, it may be arranged transversely above rear axle flaired tubes of the tractor and below the seat of the driver.

Finally, by connecting the inventive apparatus via known means to the base of the turning joints and seals, it is possible to achieve the same results for the steering wheels of the tractor, and it should be noted that such joints are necessary only to permit certain operations described above during use.

Although the invention has been described with respect to particular devices, means and embodiments, it is to be understood that the invention is not limited to those particulars disclosed and extends to cover all embodiments falling within the scope of the claims.

What is claimed is:

1. Apparatus for use with a vehicle having tires, said apparatus adapted to adjust the pressure of fluid within said tires when said tires are inflated with said fluid in the form of air, ballasting liquid, or a combination thereof, both when said vehicle is at rest and when said vehicle is moving, said apparatus comprising:
   (a) a pump adapted to compress liquid or air to a predetermined inflation pressure;
   (b) a discharge valve adapted to adjust said predetermined inflation pressure;
   (c) a reservoir adapted to receive and store said liquid;
   (d) a nozzle associated with each of said tires, each nozzle comprising a fluid feed passageway and a fluid purge passageway, each nozzle adapted to occupy a first, generally upright position in which said nozzle is capable of purging up to 100% of air present in said tire and a second, generally downwardly directed position in which said nozzle is capable of purging up to 100% of liquid present in said tire; and
   (e) a piping system interconnecting said pump to said nozzles, said reservoir, and said valve.

2. The apparatus as defined by claim 1 wherein each nozzle further comprises mounting means for attaching said apparatus to a wheel rim and an attachment element for placing each of said feed and purge passageways in fluid communication with one of said tires, said feed passageway being adapted to receive said purge passageway therein while additionally permitting the flow of fluid exterior to said purge passageway and wherein each feed passageway comprises an oblique section connected to a pipe.

3. The apparatus as defined by claim 2 wherein each mounting means is a socket.

4. The apparatus as defined by claim 2 wherein each purge passageway comprises a flexible tubing having a spigot mounted at one end thereof.

5. The apparatus as defined by claim 4 wherein each tubing is slideably mounted within an attachment element so as to be radially slideable relative to a rim.

6. The apparatus as defined by claim 5 wherein said spigot is adapted to be secured to an attachment element means such that each tubing extends to the fullest radial extent within a tire when said spigot is secured to said attachment element.

7. The apparatus as defined by claim 6 wherein said piping system comprises a pipe and valve associated with each of said tires whereby liquid may be drawn from one of said tires through its associated pipe and pumped by said pump into a pipe associated with another of said tires.

8. Apparatus in accordance with claim 1 wherein each of said tires has an internal portion of greatest diameter and said purge passageway comprises a purge orifice positioned closely adjacent to said internal portion when said nozzle is in either of said first or second positions.

9. Apparatus in accordance with claim 8 wherein said feed passageway comprises a socket positioned on a rim provided within said tire and said purge passageway further comprises a generally flexible tube extending into said tire.

10. Apparatus in accordance with claim 1 wherein said feed and purge passageways comprise conduits which are positioned to provide a simultaneous liquid feed and purging of air when said nozzle is in said first position, and a simultaneous air feed and purging of liquid when said nozzle is in said second position.

11. Apparatus in accordance with claim 10 wherein said tire includes an internal portion of greatest diameter and said purge passageway comprises a generally flexible tube extending radially into said tire and having an internal end adjacent to said greatest diameter portion and an external end positioned externally of said tire and including a selectively operable closure member.

12. Apparatus in accordance with claim 11 wherein said closure member comprises a spigot.

13. Apparatus in accordance with claim 1 wherein said piping system comprises a pipe associated with and adapted to permit said fluid to be fed to each of said tires, and a valve positioned along each of said pipes, whereby fluid can be pumped from one of said tires to another of said tires.

* * * * *